United States Patent
Phillips et al.

(10) Patent No.: US 9,088,813 B2
(45) Date of Patent: Jul. 21, 2015

(54) NETWORK PERSONAL VIDEO RECORDER SAVINGS WITH SCALABLE VIDEO CODING

(71) Applicant: Ericsson Television Inc, Duluth, GA (US)

(72) Inventors: Chris Phillips, Hartwell, GA (US); Charles Hammett Dasher, Lawrenceville, GA (US); Robert Hammond Forsman, Sugar Hill, GA (US)

(73) Assignee: ERICSSON TELEVISION INC., Duluth, GA (US)

( * ) Notice: Subject to any disclaimer, the term of this patent is extended or adjusted under 35 U.S.C. 154(b) by 69 days.

(21) Appl. No.: 14/047,088

(22) Filed: Oct. 7, 2013

(65) Prior Publication Data

US 2015/0100994 A1 Apr. 9, 2015

(51) Int. Cl.
*H04N 7/173* (2011.01)
*H04N 21/2747* (2011.01)
*H04N 21/231* (2011.01)
*H04N 21/239* (2011.01)
*H04N 21/2387* (2011.01)
*H04N 21/2389* (2011.01)
*H04N 21/4147* (2011.01)
*H04N 21/236* (2011.01)
*H04N 21/2343* (2011.01)

(52) U.S. Cl.
CPC ....... *H04N 21/2747* (2013.01); *H04N 21/2387* (2013.01); *H04N 21/2389* (2013.01); *H04N 21/2393* (2013.01); *H04N 21/23103* (2013.01); *H04N 21/23614* (2013.01); *H04N 21/234309* (2013.01); *H04N 21/4147* (2013.01)

(58) Field of Classification Search
CPC .......... H04N 21/2747; H04N 21/4334; H04N 21/6125; H04N 21/234309
USPC ................ 725/58, 92, 93, 109, 116; 709/321; 386/220
See application file for complete search history.

(56) References Cited

U.S. PATENT DOCUMENTS

| | | | |
|---|---|---|---|
| 2005/0185937 A1 | 8/2005 | Comer et al. | |
| 2009/0252217 A1* | 10/2009 | Wittig | 375/240.01 |
| 2010/0095005 A1 | 4/2010 | Le Lann et al. | |
| 2010/0333143 A1* | 12/2010 | Civanlar et al. | 725/54 |
| 2011/0010748 A1 | 1/2011 | Asami | |
| 2012/0117339 A1 | 5/2012 | Kandekar et al. | |
| 2012/0185906 A1* | 7/2012 | Doets et al. | 725/109 |
| 2013/0198403 A1* | 8/2013 | Ward | 709/231 |

FOREIGN PATENT DOCUMENTS

WO WO 2013/081625 A1 6/2013

* cited by examiner

*Primary Examiner* — Oleg Asanbayev (57) ABSTRACT

A network node in a network personal video recorder (NPVR) system receives a request from a user to record a program asset provided on a channel and responsive to a count of enhancement recordings of the channel being equal to zero, starts a plurality of enhancement layer encode captures from the broadcast feed of the channel into an enhancement warehouse. The network node also starts a base layer encode capture of a broadcast feed of the channel into an NPVR warehouse associated with the user and increments the count of enhancement recordings of the channel by one.

7 Claims, 6 Drawing Sheets

NETWORK PERSONAL VIDEO RECORDER SAVINGS WITH SCALABLE VIDEO CODING

FIELD OF THE DISCLOSURE

The present disclosure generally relates to a Network Personal Video Recorder (NPVR) system. More particularly, and not by way of any limitation, the present disclosure is directed to an NPVR system and a method on an NPVR system for storage of program assets.

BACKGROUND

Network-based PVR systems are well known as a means of allowing users to record broadcast programming content in network-based PVRs in a manner similar to the ability to record the same broadcast content in non-network-based equivalents such as digital video recorders (DVRs) and regular personal video recorders (PVRs). In general, an NPVR device allows a user or subscriber to record broadcast programs of interest for subsequent viewing, and may provide various recording options, such as recording every episode of a designated program over a period of time, such as a TV program season. The NPVR device may also record broadcast programming content in response to the user tuning to a channel and selecting the record function. The presentation of the recorded programming content can be manipulated, e.g., by exercising rewind, pause and fast-forward functions.

A concern for providers of an NPVR system is to effectively manage the storage of recorded content. Under current law, an NPVR system is required to store a unique copy of a recorded program for each subscriber that records the program. When the content is high definition (HD), the requirement to store a separate copy for each subscriber become very expensive and is expected to become prohibitively expensive with emerging technologies such as 4K video, also known as ultra-high definition.

SUMMARY

The present patent disclosure is broadly directed to a network personal video recorder (NPVR) system and method. In a method embodiment operating at an NPVR element, the method includes receiving a request from a user to record a program asset on a channel. When a count of enhancement recordings of the channel is equal to zero, i.e., no other users are currently recording on this channel, the method begins capturing a plurality of enhancement layer encodes from the broadcast feed of the channel into an enhancement warehouse. Additionally, capture of a base layer encode of the broadcast feed of the channel is started, with the captured video being stored in an NPVR warehouse that is associated with the user; the count of enhancement recordings of the channel is then incremented by one.

In another aspect, an embodiment of a network element or node operable in an NPVR system is disclosed. The NPVR element comprises a recording controller, which is adapted to receive a request from a user to record a program asset provided on a channel, and a recorder, controlled by the recording controller and adapted to record an encoded base layer of the program asset in an NPVR warehouse associated with the user. The network element is also adapted, when a count of enhancement recordings of the channel is equal to zero, to record a plurality of encoded enhancement layers in an enhancement warehouse and is further adapted to increment the count of enhancement recordings of the channel by one.

In a still further aspect, an embodiment of a non-transitory computer-readable medium containing instructions stored thereon is disclosed. When the stored instructions are executed by a computer system configured to operate as an NPVR element, the computer system is operable to perform an embodiment of the method set forth above. Further features of the various embodiments are as claimed in the dependent claims.

As will be explained in further detail hereinbelow, one or more of the embodiments of the present disclosure aim to address at least some of the concerns set forth in the foregoing background section, inter alia. For instance, one or more embodiments of the present disclosure may beneficially reduce network-based storage required in conventional NPVR implementations. Various additional benefits and advantages will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known subsystems, components, structures and techniques have not been shown in detail in order not to obscure the understanding of the example embodiments. Accordingly, it will be appreciated by one skilled in the art that the embodiments of the present disclosure may be practiced without such specific details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple networking functions, in addition to providing support for multiple application services. Subscriber end stations (e.g., set-top boxes, workstations, laptops, netbooks, palm tops, mobile phones, smartphones, multimedia phones, portable media players, etc.) may access or consume content/services provided over broadcast networks (e.g., cable networks) as well as a packet-switched wide area public network such as the Internet via suitable service provider access networks.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, a subscriber device or end station, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. Thus, the storage device or component of a given electronic device may be configured to store code and/or data for execution on one or more processors of that electronic device for purposes of implementing one or more techniques of the present disclosure.

Figure 1:
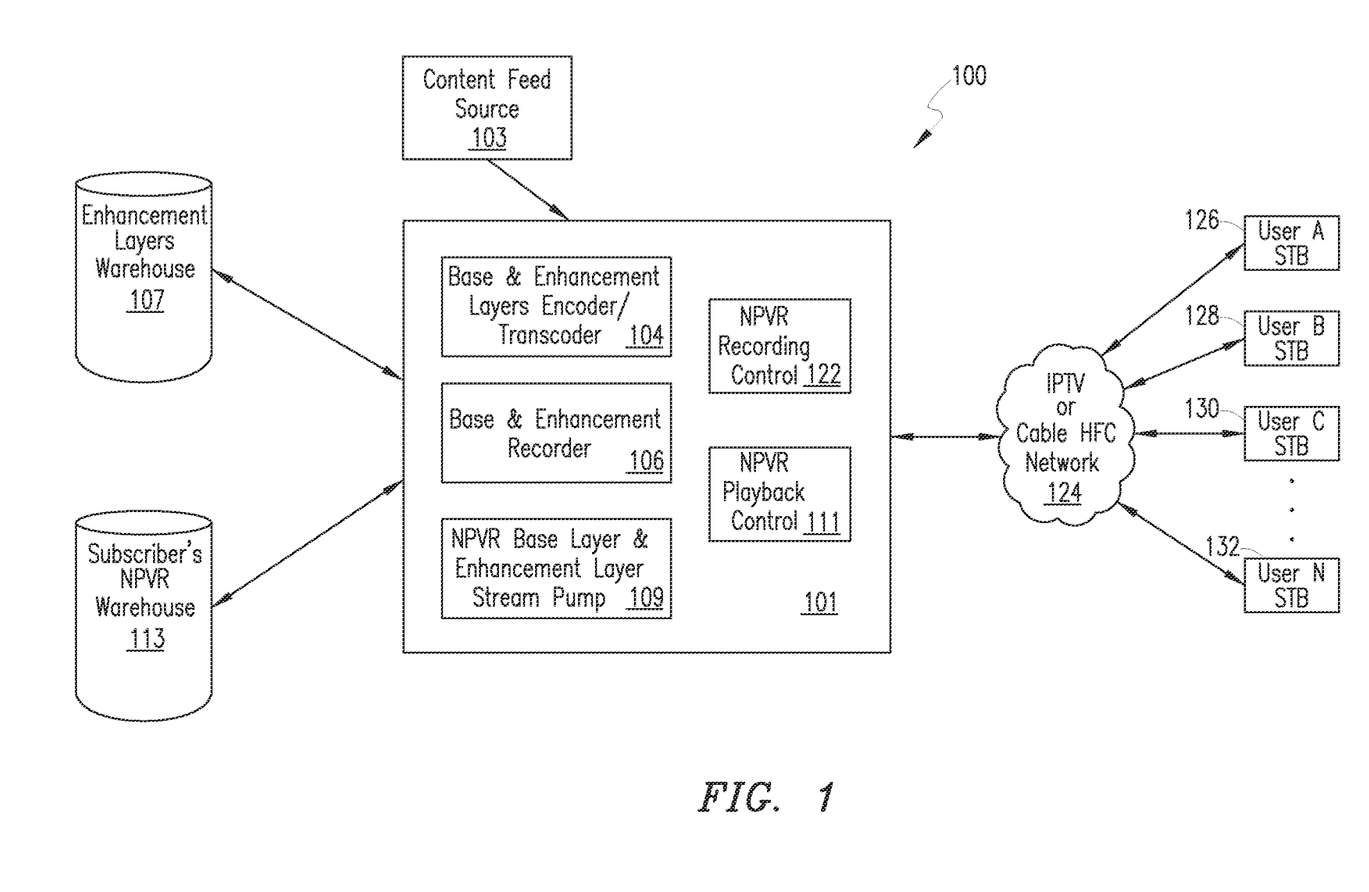
FIG. 1 depicts a network environment that includes a network personal video recorder (NPVR) system according to an embodiment of the present patent application.

Referring now to the drawings and more particularly to FIG. 1, depicted therein is an example network environment that includes an embodiment of an NPVR system 100 of the present patent application for providing recording and playback capabilities with respect to any known or heretofore unknown broadcast digital assets or program assets for a number of subscribers. Network element 101 provides recording and playback capabilities to subscribers of network 124 via set-top boxes 126, 128, 130, 132 at the subscriber's premises in accordance with an embodiment of the present disclosure. In the disclosed example, network 124 is a broadband broadcast network, such as an Internet Protocol television (IPTV) provider or Hybrid Fibre-Coaxial (HFC) cable provider, although embodiments of the disclosure are not limited by these types of providers. Further, set-top boxes 126, 128, 130, 132 may comprise appliances that not only connect the broadband broadcast network to a television or other display device for receiving program assets for live viewing and/or playback, but also operate as command consoles that can accept user inputs, commands or requests to interact with an network element disposed in the NPVR system 100 (e.g., NPVR element 101). Example set-top boxes may include PCs, laptops, notebook computers, tablets, discrete set top boxes (STBs), virtual STBs, integrated TV/STBs, smartphones, smart TVs, and the like. Program assets are stored by network element 101 using multilayer video technology known as Scalable Video Coding (SVC). SVC has so far been set forth in the following standards: H262/MPEG-2 (published as part of ISO/IEC 13818-2), H.254/MPEG-4 (published as part of ISO/IEC 14496) and in H.265/HEVC (published as part of ISO/IEC 23008-2). The disclosed embodiments are also applicable to any heretofore unknown standards that may be developed, as long as the video is stored as scalable layers. According to Scalable Video Coding, content is encoded as a base layer and one or more enhancement layers in order to meet the needs of users having wide variations in terms of connection qualities and end devices. The base layer contains a lower bit-rate video and the audio stream. The base layer is the only layer that can be decoded into playable video; each of the enhancement layers provides "enhancement" information that can be used to reconstruct a higher level of video when used with the base layer, but which cannot be played on its own. SVC uses high compression coding that allows the enhancement layers to provide temporal scalability (i.e., frame rate), spatial scalability (i.e., picture size), SNR scalability (i.e., quality and fidelity) or a hybrid or combination of these scalabilities. With large amounts of information coded in the various enhancement layers, the base layer requires a much smaller space for storage than do the various enhancement layers associated with the base layer. When network element 101 records a program asset for a user, a copy of the base layer is stored in the user's reserved storage space in the subscriber's NPVR warehouse 113, while the associated enhancement layers are stored in enhancement layers warehouse 107. As will be seen in greater detail below, when multiple users record a program asset, each subscriber has a copy of the base layer stored in their individual NPVR storage in warehouse 113, but only a single copy of each enhancement layer needs to be stored in enhancement layers warehouse 107, providing savings in the amount of storage space that is needed for the recorded content.

As seen in FIG. 1, network element 101 contains a base and enhancement layers encoder/transcoder 104, which receives incoming broadcast content and provides output feeds that are coded as a base layer and multiple enhancement layers, with each enhancement layer encoded for a specific size and fidelity of display. A base and enhancement recorder 106 records the base layer into subscriber's NPVR warehouse 113 and records the enhancement layers into enhancement layers warehouse 107. NPVR base layer and enhancement layer stream pump 109 delivers content to the subscribers in response to playback requests. NPVR recording control 122 receives user requests and controls the recording process in response these requests, while and PVR playback control 111 receives user playback requests and controls playback of the recorded programs. Content feed source 103 provides program assets to NPVR element 101. The program assets provided by content feed source 103 can include any type of broadcast audio/video content or program segment having a start time and an end time such as live and/or recorded over-the-air free network television (TV) shows or programs, pay TV broadcast programs via cable networks and IPTV programs as well as other content assets provided by content owners or providers.

Figure 1A:
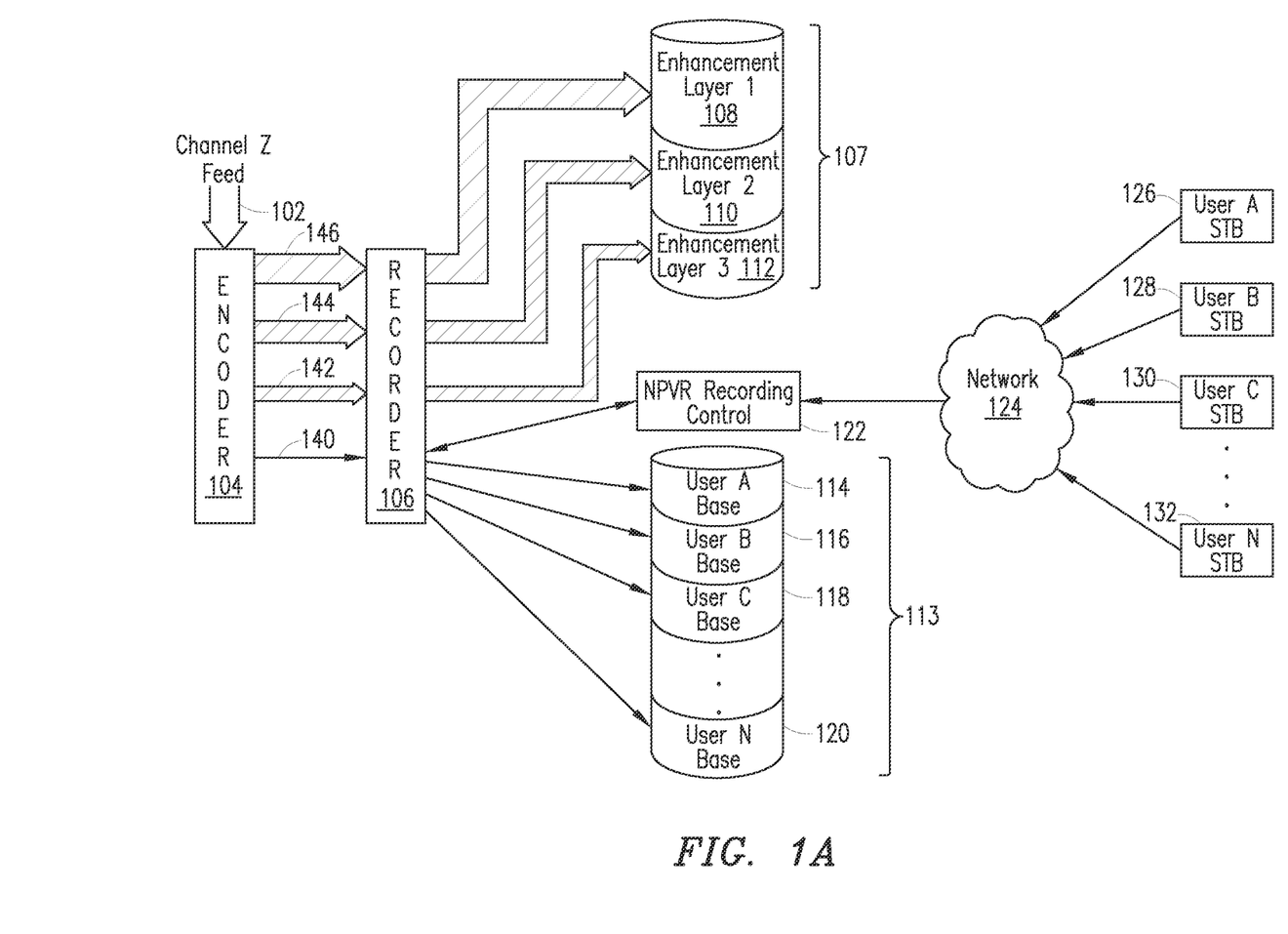
FIG. 1A depicts a block diagram showing the flow of information between elements of an NPVR system during recording of a program asset according to an embodiment of the present patent application.

With reference now to FIG. 1A, the flow of information shown in FIG. 1A is discussed according to an embodiment of the disclosure. In this example, four user set-top boxes 126, 128, 130, 132 are shown, although it will be understood that the number of subscribers recording any given program asset can vary from none to a large number. Additionally, in at least some embodiments, a single user can record assets from multiple channels at the same time. Such complexities are not specifically shown for ease of understanding the present disclosure. Each of the subscribers provides instructions to node 101 using their respective set-top box 126, 128, 130, 132. The instructions can be contained in a pre-set recording request, e.g., record the program asset on channel Z between the times xx:xx:xx and xx:xx:xx. Instructions can also be provided by manipulation of "record" and "stop" mechanisms that the subscriber activates to initiate or stop recording. These instructions are carried by network 124 to NPVR recording control 122. At the indicated start time or else when the user initiates recording, NPVR recording control 122 sends a message to recorder 106 to initiate recording of appropriate base and enhancement layers as requested by the subscriber. Broadcast program assets are received on a number of channels from content feed source 103. One such channel is shown as Channel Z feed 102. One skilled in the art will appreciate that multiple channels can be received and recorded from content feed source 103 at one time, although only one channel is represented in the figure for simplicity. The broadcast received via Channel Z feed 102 in an example embodiment is sent with a resolution of 1920×1080 p at 15 Mbs. In this example, base and enhancement encoder/transcoder 104 outputs base layer stream 140 and three enhancement layer streams 142, 144, 146, although the number of enhancement layer streams can be greater or fewer. Base layer stream 140 has a resolution of 416×234 p at 500 Kbs. Enhancement layer stream 142 is a hybrid enhancement layer with a resolution of 720×480 p at 2 Mbs. Similarly, enhancement layer stream 144 is a hybrid layer with a resolution of 1280×720 p and enhancement layer 146 is a hybrid layer with a resolution of 1920×1080 i/p. Recorder 106 receives base layer stream 140 and enhancement layer streams 142, 144, 146 and stores a copy of base layer stream 140 in subscriber NPVR warehouse 113 for each subscriber who is currently recording. As long as any subscribers are recording Channel Z, recorder 106 will also store a copy of each of enhancement layer streams 142, 144, 146 in enhancement layers warehouse 107. As illustrated, enhancement layer stream 142 is stored in enhancement layers warehouse 107 as Enhancement Layer 3 112. Similarly, enhancement layer stream 144 is stored as Enhancement Layer 2 110 and enhancement layer stream 146 is stored as Enhancement Layer 1 108. Enhancement Layers 108, 110, 112 each contain their respective enhancement layer capture for a specific segment of time, e.g., a one hour segment.

The enhancement files, which are to be shared by multiple users, are stored during any time period in which any user is recording on Channel Z. In contrast, the base layer file stored in each subscriber's NPVR storage is only recorded for the period requested. For example, User A requests that Channel Z be recorded during the time frame 9:00 AM to 9:30 AM. Accordingly, at the end of the specified time period, User A base 114 contains a base layer recording at resolution 416× 234 p at 500 Kbs covering the time frame from 09:00:00 to 09:30:00. User B requests that Channel Z be recorded during the time period 9:20 AM to 9:30 AM; consequently User B base 116 contains a base layer recording at resolution 416× 234 p at 500 Kbs covering the time frame from 09:20:00 to 09:30:00. User C requests that Channel Z be recorded during the time frame 9:00 AM to 9:45 AM; consequently User C base 118 contains a base layer recording at resolution 416× 234 p at 500 Kbs covering the time frame from 09:00:00 to 09:45:00. User N selects the record button on Channel Z at 9:09 AM and at 10:00 AM has not yet selected the stop button. User N Base 120 contains a base layer recording at resolution 416×234 p at 500 Kbs covering the time frame from 09:08:00 to ??:??:??, with ?? denoting a time the user will hit the stop button.

Figure 2:
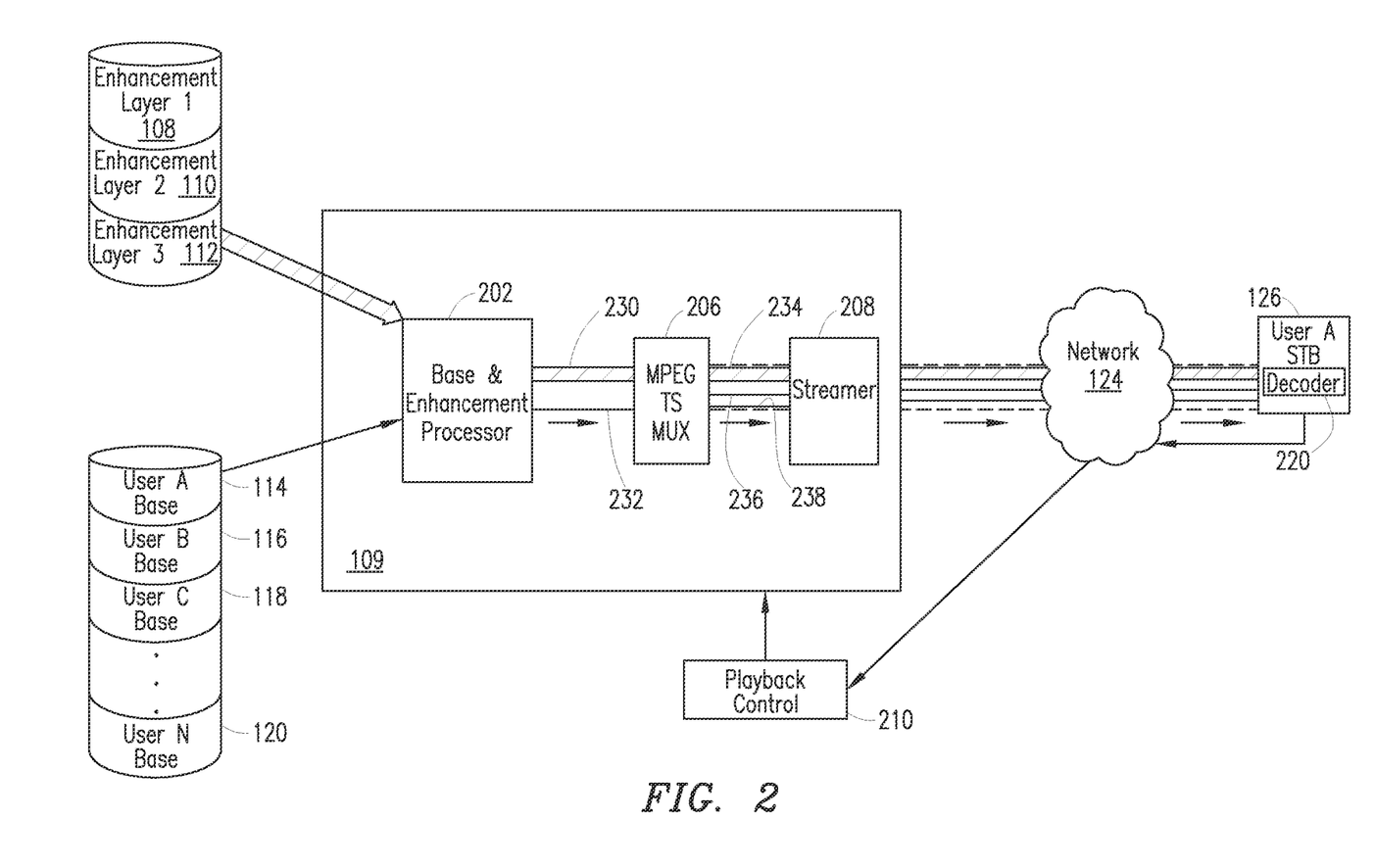
FIG. 2 depicts a block diagram showing an embodiment of the flow of information between elements of a NPVR system during playback of a program asset according to an embodiment of the present patent disclosure.

Turning next to FIG. 2, shown is the information flow for playback of a recorded program asset according to an embodiment of the disclosure. In the disclosed embodiment, User A STB 126 contains decoder 220, which is able to receive the base and enhancement layers and decode 2the separate files into an appropriately enhanced playable video format. User A STB 126 sends a request for playback at standard definition (SD) of the program asset that was recorded in FIG. 1A, which in the example embodiment is a recording of Channel Z during the time period 09:00 through 09:30 AM. The request is sent through network 124 and received at playback control 210. Playback control 210 then informs NPVR base layer & enhancement layer stream pump 109 to provide the requested playback of Channel Z for User A from 09:00:00 to 09:30:00. Once received at NPVR Stream Pump 109, base and enhancement processor 202 identifies and retrieves the requested User A base 114 and further determines the presentation time stamps (PTS) that correspond to the beginning and ending times for the recorded base layer. In this example, the recording starting time of 09:00:00 AM is equivalent to a PTS of 330000000 and the recording stopping time of 09:30:00 is equivalent to a PTS of 492000000. Base and enhancement processor 202 then retrieves the appropriate enhancement layer, e.g. enhancement layer 3 112, which when combined with User A base 114 will provide SD video to the user. Base and enhancement processor 202 then parses enhancement layer 112 to locate starting PTS 330000000. Once the starting PTS is located, enhancement layer 112 and User A base 114 are streamed to MPEG transport stream (TS) multiplexor (MUX) 206 as enhancement stream 230 and base stream 232. MPEG TS MUX 206 outputs a multiplexed transport stream 240 (shown as dotted lines). In the illustrated embodiment, transport stream 240 contains three elementary streams, i.e., enhancement layer stream 234, base layer stream 236 and audio stream 238. Transport stream 240 is provided to streamer 208, which streams the multiplexed transport stream to user A STB 126 via network 124. At STB 126, decoder 220 decodes/transcodes the transport stream into a format that can be forwarded to the user's television or other display device. In an alternate embodiment that is not specifically shown, each of the elementary streams 234, 236, 238 shown in FIG. 2 is sent as a separate transport stream to streamer 208, which in turn streams the three transport streams to user A STB 126.

Figure 3:
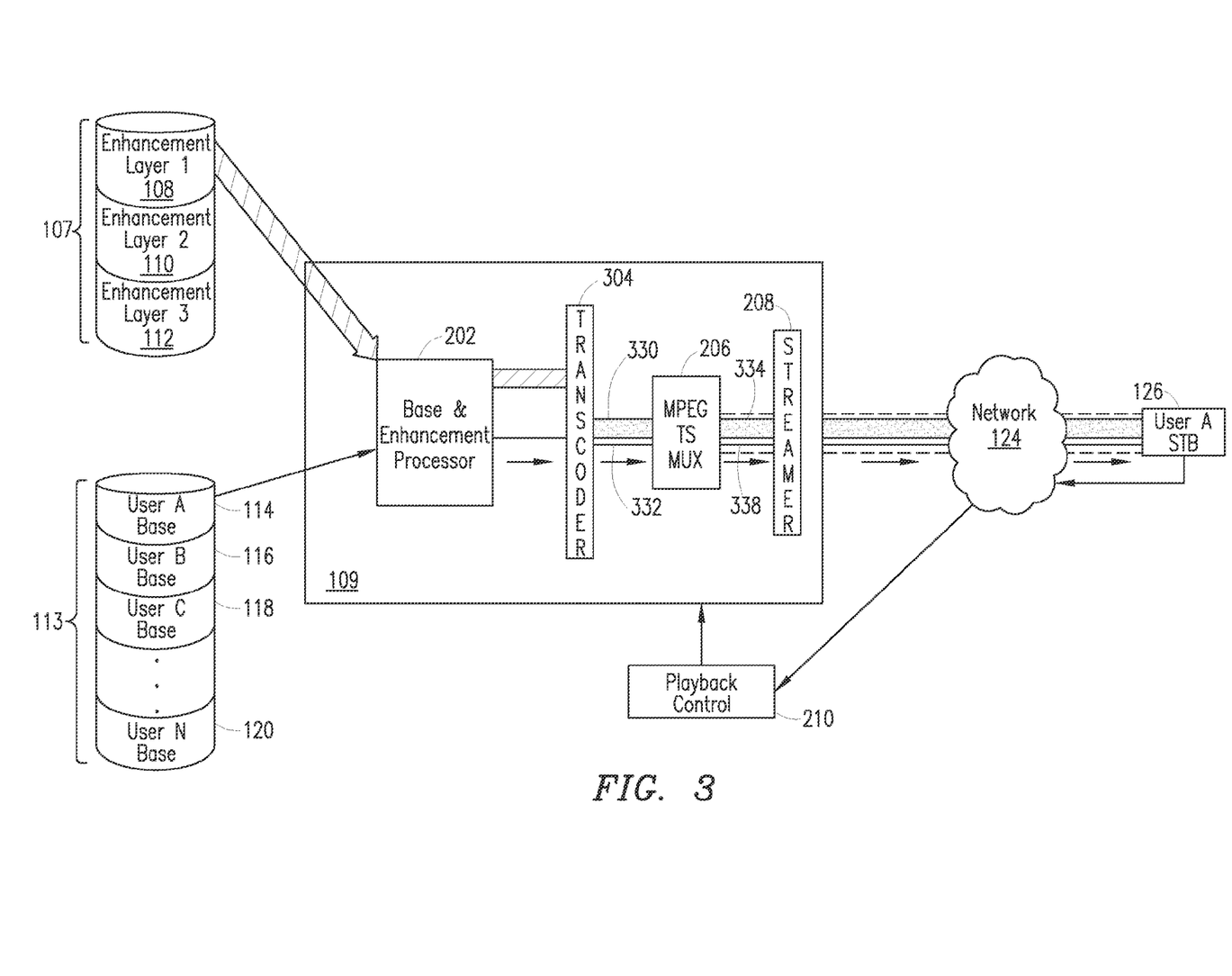
FIG. 3 depicts a block diagram showing an embodiment of the flow of information between elements of a NPVR system during playback of a program asset according to an embodiment of the present patent disclosure.

FIG. 3 illustrates another embodiment of NPVR base layer and enhancement layer stream pump 109 that can be used with a user set-top box that does not contain a decoder for scalable video coding. As in the example discussed in FIG. 2, User A STB 126 sends a request for playback of the program asset recorded in FIG. 1A, this time requesting a high-definition (HD) version of the video. The request is sent via network 124 to playback control 210, which sends a message to base layer and enhancement layer stream pump 109. Base and enhancement processor 202 retrieves User A base 114 and HD enhancement layer 108. Processor 202 determines the starting PTS to be 330000000 and the ending PTS to be 492000000 for User A base 114 and locates starting PTS 330000000 of enhancement layer 108. Enhancement layer 108 and User A base 114 are then sent to transcoder 304, where these two layers are transcoded to a standard format, e.g. H264/MPEG-4, and sent to MPEG TS MUX 206 as video stream 330 and audio stream 332. At MPEG TS MUX 206, video stream 330 and audio stream 332 are multiplexed to form a transport stream containing two elementary streams, video stream 334 and audio stream 338. This combined transport stream is sent to streamer 208, which streams the transport stream through network 124 to User A STB 126 for display on the user's display device.

Figure 4A:
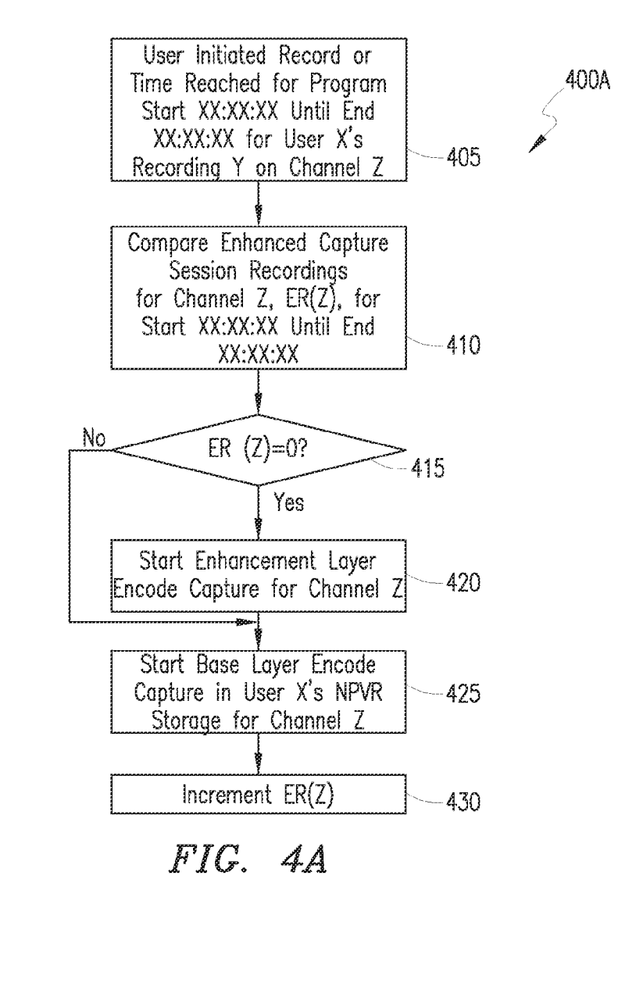
FIG. 4A depicts a flowchart of a method of processing a request to record at an NPVR node according to an embodiment of the present patent disclosure.

FIG. 4A illustrates the process (400A) of initiating capture of a program asset according to an embodiment of the disclosure. NPVR element 101 receives (405) a user-initiated "Record" signal or else the starting time is reached for a request to record a program on Channel Z between times XX:XX:XX and XX:XX:XX. NPVR element 101 compares (410) the number of enhanced session recordings currently being captured for channel Z, designated herein as ER(Z). If ER(Z) is currently equal (415) to zero, i.e., no other users are currently recording a program on channel Z, NPVR element 101 starts (420) the enhancement layer encode capture for channel Z in enhancement layers warehouse 107; otherwise, if ER(Z) does not equal zero, the enhancement layer encode capture is already being done and does not need to be started. NPVR element 101 starts (425) a base layer encode capture of channel Z in User X's NPVR storage in subscriber's NPVR warehouse 113 and also increments (430) ER(Z) to indicate that an additional recording is now being made of channel Z. After being started, capture of the base layer in subscriber warehouse 113 and capture of the enhancement layers in warehouse 107 continues until the recording session is stopped, as illustrated in FIG. 4B.

Figure 4B:
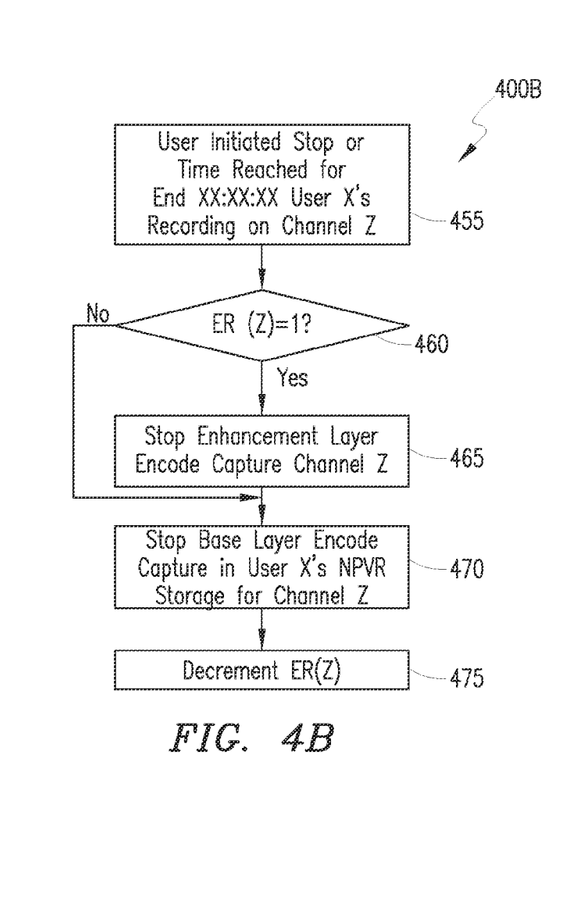
FIG. 4B depicts a flowchart of a method of processing a request to stop recording at an NPVR node according to an embodiment of the present patent disclosure.

FIG. 4B illustrates the process (400B) of stopping the capture of a program asset according to an embodiment of the disclosure. NPVR element 101 receives (455) a user-initiated "Stop" or else reaches the end time XX:XX:XX designated in the user's request to record channel Z. When this occurs, NPVR element 101 determines whether ER(Z) is equal (460) to one. If ER(Z) is equal to one, indicating that the current user is the only subscriber currently recording channel Z, NPVR element 101 stops (465) the enhancement layer encode capture of channel Z; if ER(Z) is not equal to 1, then other subscribers are recording channel Z and the enhancement layer encode capture will continue. NPVR element 101 stops (470) base layer encode capture in User X's NPVR storage for channel Z and decrements ER(Z) to indicate that there is one less subscriber currently recording channel Z.

Figures 5A, 5B:
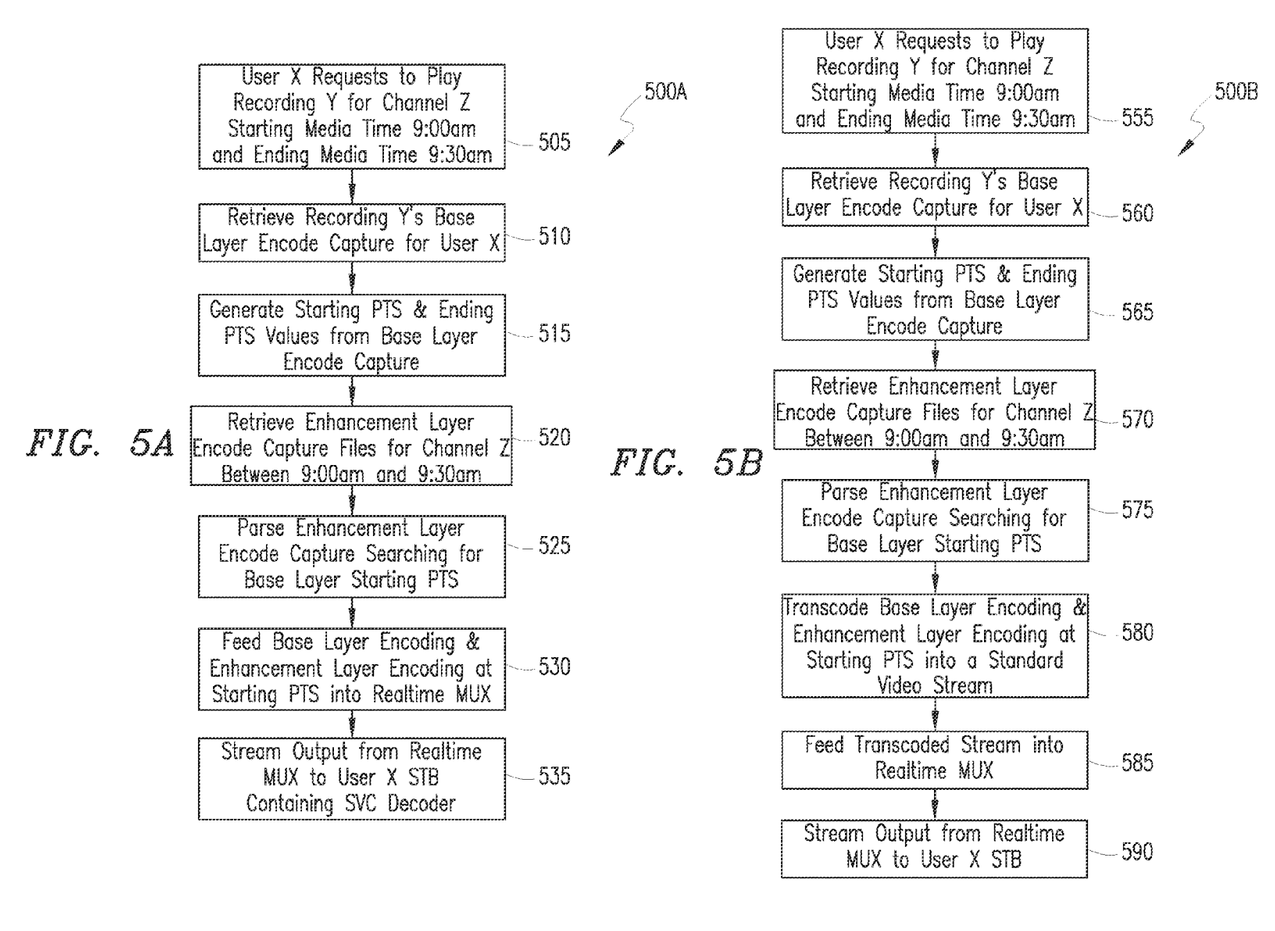
FIG. 5A depicts a flowchart of a method of processing a request to playback a recording at an NPVR node according to an embodiment of the present patent disclosure.
FIG. 5B depicts a flowchart of a method of processing a request to playback a recording at an NPVR node according to an embodiment of the present patent disclosure.

FIG. 5A illustrates the process (500A) of playback of a program asset according to the embodiment of the disclosure shown in FIG. 2. NPVR element 101 receives (505) a user request to play recording Y for channel Z, which has a starting media time of 9:00 AM and an ending media time of 9:30 AM. Element 101 will retrieve (510) the base layer encode capture, e.g. 114, for recording Y from subscriber warehouse 113 and use the recorded times to generate (515) a starting PTS value and an ending PTS value from the base layer encode capture. After retrieving (520) the appropriate enhancement layer encode capture file from enhancement layer warehouse 107, e.g. enhancement layer 112, the enhancement layer encode capture file is parsed (525) searching for the PTS that corresponds to the base layer starting PTS. Once the starting PTS has been located, element 101 feeds (530) the base layer encoding, e.g. 114, and the enhancement layer encoding, e.g., 112, at the starting PTS into a real-time MUX, such as MPEG TS MUX 206. Element 101 then streams (535) the output from the real-time MUX to the user's STB, which contains an SVC decoder (220) that can decode the stream into a standard format playable on the user's television or other display screen.

FIG. 5B illustrates the process (500B) of playback of a program asset according to the embodiment of the disclosure shown in FIG. 3. In the method disclosed in this figure, NPVR element 101 receives (555) a user request to play recording Y for channel Z, which again has a starting media time of 9:00 AM and an ending media time of 9:30 AM. NPVR element 101 will retrieve (560) the base layer encode capture, e.g., 114, for recording Y from subscriber warehouse 113 and use the recorded times to generate (565) a starting PTS value and an ending PTS value from the base layer encode capture. After retrieving (570) the appropriate enhancement layer encode capture file, e.g., 108, from enhancement layer warehouse 107, the enhancement layer encode capture file is parsed (575) searching for the PTS that corresponds to the base layer starting PTS. Once the starting PTS has been located, element 101 transcodes (580) the base layer encoding and the enhancement layer encoding at the starting PTS into a standard video format stream, e.g., MPEG-4. NPVR element 101 then feeds (585) the transcoded stream into a real-time multiplexor, e.g., MUX 206, and then sends the multiplexed stream to streamer 208. Streamer 208 streams (590) the output stream to the user's STB, which in turn provides the program asset to the user's television or other display.

It should be appreciated that the embodiments of the present disclosure can advantageously reduce the amount of network-based storage required in conventional NPVR implementations where copies of all requested programs are typically stored at multiple resolutions for each subscriber. Instead of storing the multiple large content files on the NPVR system for each subscriber, smaller base layers are stored for the individual users in order to meet legal requirements, while the larger enhancement layer files, which are not playable video, are not reproduced for each subscriber, but shared by multiple subscribers.

Although the embodiments shown above save only a single copy of the enhancement layers, a number of modifications to this method are possible. In one embodiment, when a second user requests a recording of an channel, e.g., channel Z, which is already being recorded, a subset of the full set of enhancement layers can be stored. For example, rather than prohibiting the making of any additional copies of the enhancement layers, as disclosed in the flowcharts, at least one of the enhancement layers can be stored when additional subscribers are recording the channel. In a further variation, the entire set of the enhancement layers may be stored in addition to the base layer responsive to a recording request by the second or subsequent users requesting the same content on a channel.

In the foregoing Detailed Description, functionalities of the various elements including components/blocks labeled or described as "module" or "process" or "processor" or "controller" or "computer" may be provided through the use of dedicated hardware as well as hardware capable of executing stored or preconfigured software. When provided by a processor, the functions may be provided by a single dedicated processor, by a single shared processor, or by a plurality of individual processors, some of which may be shared or distributed. Moreover, a "processor" or "controller" or "memory" may include, without limitation, digital signal processor (DSP) hardware, ASIC hardware, read only memory (ROM), random access memory (RAM), and/or other storage media.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method performed in a network node operable in a network personal video recorder (NPVR) system, the method comprising:
   receiving a request from a user to record a program asset provided on a channel;
   responsive to a count of enhancement recordings of the channel being equal to zero, starting a plurality of enhancement layer encode captures from the broadcast feed of the channel into an enhancement warehouse;
   starting a base layer encode capture of a broadcast feed of the channel into an NPVR warehouse associated with the user;
   incrementing the count of enhancement recordings of the channel by one;
   receiving a request from the user to stop recording of the program asset on the channel;
   responsive to a count of enhancement recordings of the channel being equal to one, stopping the enhancement layer encode capture;
   responsive to the count of enhancement recordings of the channel not being equal to one, continuing the enhancement layer encode capture;
   stopping the base layer encode capture;
   decrementing the count of enhancement recordings of the channel by one;
   receiving a request from the user to play the recorded program asset, the request indicating a selected enhancement layer,
   retrieving the base layer encode capture from the NPVR warehouse associated with the user;
   generating a starting presentation time stamp (PTS) and an ending PTS from the base layer encode capture;
   retrieving the selected enhancement layer encode capture of the plurality of enhancement layer encode captures from the enhancement warehouse;
   parsing the selected enhancement layer encode capture to locate the starting PTS;
   feeding the base layer encode capture and the enhancement layer encode capture at the starting PTS into a real-time multiplexer;
   streaming the output from the real-time multiplexer to a set-top box of the user containing a scalable video coding decoder, wherein the output from the real-time multiplexer comprises a transport stream comprising a first elementary stream of the base layer encode capture, a second elementary stream of an audio encode and a third elementary stream of the selected enhancement encode capture.

2. The method as recited in claim 1 further comprising
   receiving a request from the user to play the recorded program asset, the request indicating a selected enhancement layer,
   retrieving the base layer encode capture from the NPVR warehouse associated with the user;
   generating a starting presentation time stamp (PTS) and an ending PTS from the base layer encode capture;
   retrieving the selected enhancement layer encode capture of the plurality of enhancement layer encode captures from the enhancement warehouse;
   parsing the selected enhancement layer encode capture to locate the starting PTS;
   transcoding the base layer encode capture and the enhancement layer encode capture at the starting PTS into a standard video stream;
   feeding the standard video stream into a real-time multiplexer; and
   streaming the output from the real-time multiplexer to a set-top box of the user.

3. A network element configured to operate in a network personal video recorder (NPVR) system, the network element comprising:
   a recording controller adapted to receive a request from a user to record a program asset provided on a channel;
   a recorder, controlled by the recording controller, adapted to record an encoded base layer of the program asset in an NPVR warehouse associated with the user and further adapted, responsive to a count of enhancement recordings of the channel being equal to zero, to record a plurality of encoded enhancement layers in an enhancement warehouse and further adapted to increment the count of enhancement recordings of the channel by one;
   the recording controller is further adapted to receive a request to stop the recording;
   the recorder is further adapted to stop recording the encoded base layer in response to the request;
   the recorder is further adapted to responsive to a count of enhancement recordings of the channel being equal to one, to stop recording the plurality of encoded enhancement layers;

the recorder is further adapted to responsive to a count of enhancement recordings of the channel not being equal to one, continue recording the plurality of encoded enhancement layers;

the recorder is further adapted to decrement the count of enhancement recordings of the channel by one;

a playback controller adapted to receive a request from the user to play the recorded program asset, the request indicating a selected enhancement layer;

a base and enhancement layer stream pump adapted, responsive to the request from the user, to receive the recorded base layer and the selected enhancement layer and to stream at least one output stream to a set top box associated with the user;

wherein the base and enhancement layer stream pump comprises:

a base and enhancement processor adapted to retrieve the recorded base layer from the NPVR warehouse associated with the user and to retrieve the selected enhancement layer of the recorded plurality of enhancement layers from the enhancement warehouse and further adapted to determine a starting presentation time stamp (PTS) and an ending PTS from the recorded base layer and to parse the selected enhancement layer to locate the starting PTS;

an MPEG TS multiplexor adapted to receive the recorded base layer and the selected enhancement layer at the starting PTS and to output a multiplexed stream;

a streamer adapted to stream the multiplexed stream to a set top box associated with the user;

wherein the MPEG TS multiplexor is adapted to output a multiplexed stream comprising a transport stream containing a first elementary stream corresponding to the video of the recorded base layer, a second elementary stream corresponding to the audio of the recorded base layer and a third elementary stream corresponding to the selected enhancement layer.

4. The network element as recited in claim 3 wherein the encoded base layer comprises standalone audio and video and each of the plurality of encoded enhancement layers comprises data that does not form playable video.

5. The network element as recited in claim 4 further comprising an encoder adapted to receive a broadcast feed of the channel and to send the encoded base layer and the plurality of encoded enhancement layers to the recorder.

6. The network element as recited in claim 4 wherein the base and enhancement layer stream pump comprises: a base and enhancement processor adapted to retrieve the recorded base layer from the NPVR warehouse associated with the user and to retrieve the selected enhancement layer of the recorded plurality of enhancement layers from the enhancement warehouse and further adapted to determine a starting presentation time stamp (PTS) and an ending PTS from the recorded base layer and to parse the selected enhancement layer to locate the starting PTS; a transcoder adapted to receive the recorded base layer and the selected enhancement layer starting at the starting PTS and to output an audio stream and a video stream according to a video standard; an MPEG TS multiplexor adapted to receive the audio stream and the video stream and to output a multiplexed video stream; and a streamer adapted to stream the multiplexed video stream to the set top box associated with the user.

7. A non-transitory computer-readable medium containing instructions stored thereon which, when executed by a computer system configured to operate as a network element in a network personal video recorder (NPVR) system, perform the acts:

upon receiving a request from a user to record a program asset provided on a channel: responsive to a count of enhancement recordings of the channel being equal to zero, starting a plurality of enhancement layer encode captures from the broadcast feed of the channel into an enhancement warehouse; starting a base layer encode capture of a broadcast feed of the channel into an NPVR warehouse associated with the user; and incrementing the count of enhancement recordings of the channel by one;

upon receiving a request from the user to stop recording of the program asset on the channel: responsive to a count of enhancement recordings of the channel being equal to one, stopping the enhancement layer encode capture; responsive to a count of enhancement recordings of the channel not being equal to one, continuing the enhancement layer encode capture; stopping the base layer encode capture; and decrementing the count of enhancement recordings of the channel by one;

upon receiving a request from the first user to play the recorded program asset, the request indicating a selected enhancement layer, retrieving the base layer encode capture from the NPVR warehouse associated with the user;

generating a starting presentation time stamp (PTS) and an ending PTS from the base layer encode capture;

retrieving the selected enhancement layer encode capture of the plurality of enhancement layer encode captures from the enhancement warehouse;

parsing the selected enhancement layer encode capture to locate the starting PTS;

creating an output stream from the base layer encode capture and the selected enhancement layer encode capture at the starting PTS; and streaming the output stream to a set-top box of the user, wherein the instructions create the output stream by multiplexing the base layer encode capture and the selected enhancement layer encode capture to form elementary streams within a single transport stream.

* * * * *